Patented May 29, 1928.

1,671,345

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

METHOD OF PREPARING CATALYTIC MATERIALS.

No Drawing. Application filed October 21, 1920, Serial No. 418,447, and in France October 28, 1919.

This invention relates to improvements in methods of producing catalytic materials, adapted particularly for use in the synthetic production of ammonia.

When a bar of iron or of ordinary steel is melted in a suitable container by heating a portion thereof to a white heat, with an oxyhydrogen blowpipe, for example, and then directing upon it a jet of oxygen, escaping preferably through a pipe of relatively large diameter, the iron rapidly melts and is in part oxidized. The resulting molten mixture is made up of iron oxide accompanied by a considerable proportion of molten iron. If the material so obtained is used in the synthesis of ammonia it is found to be a very poor catalyzer, yielding generally with pressures of the order of one thousand atmospheres a mixture containing only from about one tenth to one or two per cent of ammonia. The poor catalytic properties of this material are due apparently to its large content of iron and lower oxide of iron. At any rate I have found that the material obtained by melting and burning iron as above described can be made into a more efficient catalyst if the melted mass is subjected to further oxidation by a jet of oxygen.

According to the present invention, the above mentioned material, made by fusing highly heated iron with an oxygen jet, is subjected, while it is still in a molten or fused state, to the action of a jet of oxygen which brings about a further considerable elevation of temperature, evidently due to the combination of further amounts of oxygen with the oxide. This increase is oxygen content of the oxide results in a very great increase in the catalytic activity of the oxide when used in the catalytic synthesis of ammonia. Thus, by this method a catalyst is obtained which yields under the above-named conditions of pressure, flow and temperature, a composition reaching 10 to 15% of ammonia. This material, however, although it shows a very great increase in catalytic activity, has a relatively short life, even with very pure reacting gases.

I have found that the catalytic activity of this oxide can be still further increased and the effective life of the oxide, as a catalyst, can be prolonged by combining therewith a suitable amount of magnesia.

The following specific description illustrates the preferred method of operation:

A heated bar of iron in a magnesia crucible is subjected to the action of a jet of oxygen. When a sufficient quantity of the molten oxidized mass containing some molten iron is collected in the crucible, say some kilograms, for example, and while the mass is still molten, a jet of oxygen, sufficiently intense to cause an energetic stirring is directed upon the molten mass. An enormous elevation in temperature is produced in consequence of the combustion of the metallic iron and the further oxidation of the mass. This increase in temperature is such that a considerable proportion of the magnesia of the crucible is dissolved in the liquid. It is therefore necessary to employ an unusually refractory material such as magnesia for the container of the molten oxide during this operation. The resulting oxidized product thus produced is cast on a sheet of iron, and, after suitable comminution, constitutes an excellent catalyzer for the manufacture of ammonia.

When the catalyzer thus employed is used in the synthetic production of ammonia, for example, at a pressure of 1000 atmospheres and a temperature of about 600° C., and with a considerable volume of gases passing through the catalyzer in the order of 100 liters per hour per cubic centimeter of catalyzer, the ammonia content of the resulting gases may be as high as 25 to 30%, corresponding to a combination of 40 to 50% of the reacting gases.

The catalyzer produced as above described, while it enables a high percentage conversion of the reacting gases to be obtained, nevertheless has a relatively short effective life, decreasing materially in its catalytic power in a period of, for example, 10 to 15 hours.

I have found that a catalyzer which combines the advantageous properties of high conversion with long life can be produced by adding other bodies to the oxidized oxide, particularly by the addition of lime. The enormous temperature obtained during the oxidation and the energetic stirring incident thereto furnish a powerful and unexpected means for dissolving in the oxide of iron, while in the liquid state, even bodies of the most refractory nature. An addition of lime is particularly advantageous. If from 5 to 10% of lime is added in successive increments to the crucible while it is being filled with the molten oxide of iron, and a jet of oxygen of large cross-section is projected on the fused material with sufficient velocity to bring about a vigorous stirring, the lime is rapidly dissolved, sometimes with considerable swelling. If the metal contains objectionable impurities, the further oxidation should be carried further and should be continued until the surface of the liquid bath begins to congeal. If the oxide is free from objectionable impurities, the operation can be arrested as soon as the mixture becomes sufficiently homogeneous and when all the pasty iron at the bottom of the crucible has been converted into oxide and further oxidized. Even in this case, however, the maximum oxidation, that is to say, when continued until the surface of the bath congeals, can be effected generally without objectionable result, and is almost always desirable from the standpoint of the life of the catalyzer and the proportion of ammonia produced.

When the oxidation has been completed, the material is then cast into sheets and broken up into particles of the desired fineness for use in the catalytic chamber. It forms a catalyzer which combines the advantages of very great initial activity with long life. The catalyzer may thus be used for a long period of time, for example, up to several hundreds of hours, before the proportion of ammonia produced has decreased to half the original proportion.

The catalytic activity of the catalyst can be further improved by adding alkali metal oxids in small proportion to the lime.

The catalzyer produced as above described is of particular value for use in the synthetic production of ammonia under hyper-pressures of the order of 1000 atmospheres, although the catalyzer is available for use for other purposes. The catalyzer is thus of particular advantage for use in the synthetic production of ammonia according to the process of my prior United States Patent No. 1,332,460, and, when so used, gives a high percentage conversion of the reacting gases. This high percentage conversion can be obtained with the oxide even without the addition of lime; but this high percentage conversion can be combined with long effective life if the lime is combined with the material in the manner above described.

In the carrying out of the synthetic ammounia process, the improved catalyzer, produced as above described, may be placed in a suitable catalytic chamber, for example, in an apparatus such as is illustrated and described in my said prior Patent No. 1,332,460, and the reacting gases passed therethrough at an appropriate temperature and pressure and at a sufficient rate of flow of the gases. The pressure range may thus be, for example, between 400 and 2000 atmospheres, and the temperature around 500 to 700° C., as described in my aforesaid patent.

I claim:

1. The method of preparing an improved iron oxide catalyst, which comprises heating fused iron oxide upon a support containing magnesia and absorbing magnesia from the support in the fused mass.

2. The method of preparing an improved catalyst, which comprises melting and burning iron until it is substantially oxidized and thereafter directing a blast of oxygen upon the molten mass to raise the temperature thereof.

3. The method of preparing an improved catalyst, which comprises directing a blast of oxygen upon a molten mass of incompletely oxidized iron to raise the temperature thereof.

4. The method of preparing an improved catalyst, which comprises melting and burning iron and thereafter subjecting the molten mass to a blast of oxygen until the surface of the molten mass begins to congeal.

5. The method of preparing an improved catalyst, which comprises directing a blast of oxygen upon a molten mass of incompletely oxidized iron until the surface of the molten mass begins to congeal.

6. The method of preparing an improved catalyst, which comprises melting and burning iron until it is substantially oxidized and thereafter subjecting the molten mass obtained to agitation produced by a blast of oxygen directed on the mass with accompanying rise in temperature of the mass.

7. The method of preparing an improved catalyst, which comprises subjecting a molten mass of incompletely oxidized iron to agitation produced by a blast of oxygen directed on the mass with accompanying rise in temperature of the mass.

8. The method of preparing an improved catalyst, which comprises melting and burning iron and maintaining it while molten in an atmosphere of oxygen until the mass begins to congeal.

In testimony whereof I affix my signature.

GEORGES CLAUDE.